United States Patent [19]
McMurtry et al.

[11] Patent Number: 5,934,056
[45] Date of Patent: Aug. 10, 1999

[54] MOWER GRASS COLLECTING AND DISTRIBUTING

[75] Inventors: Ben Quinton McMurtry, Dursley; Richard Dyke McMurtry, Bristol; David Roberts McMurtry, Wotton-Under-Edge, all of United Kingdom

[73] Assignee: McMurtry Limited, Dursley, United Kingdom

[21] Appl. No.: 08/842,818

[22] Filed: Apr. 17, 1997

[30]   Foreign Application Priority Data

Apr. 19, 1996 [GB] United Kingdom ............ 9608116

[51] Int. Cl.[6] .................................................. A01D 34/48
[52] U.S. Cl. ........................ 56/203; 56/200; 56/205; 111/11; 239/650
[58] Field of Search ............... 56/199, 202, 203, 56/200, 205; 111/11, 12, 130; 239/650, 658, 659, 68

[56]   References Cited

U.S. PATENT DOCUMENTS 2,619,355  11/1952  Trees .
2,774,602  12/1956  Sanderson .
2,974,963   3/1961  McBride .
3,846,963  11/1974  Pedigo .
4,377,230   3/1983  Burkner ........................ 239/650 X
4,558,559  12/1985  Klever .......................... 56/202 X
5,070,683  12/1991  Eggenmueller ................. 56/202 X
5,076,045  12/1991  McClung, IV .
5,152,128  10/1992  Stoican .
5,157,907  10/1992  Wolf ............................. 56/203
5,517,811   5/1996  Schaedler et al. ............. 56/202 X
5,678,399  10/1997  Baron ........................... 56/202 X

FOREIGN PATENT DOCUMENTS 290774  5/1928  United Kingdom .
500929  2/1939  United Kingdom .

*Primary Examiner*—Heather Shackelford
*Attorney, Agent, or Firm*—Larson & Taylor

[57]   ABSTRACT

A mower (100) has a collecting box (108,110;1) with the dual functions of collecting mown grass and distributing grass or other material over the ground. Thus the box has an outlet opening (12) which is closed or obstructed during grass collection. It may be an elongate opening which is obstructed by an elongate brush (2) or paddle (8) member which is rotatable when it is desired to discharge material. The box may have a mechanism such as a belt or other conveyor (10;11;12) for conveying material to the opening.

10 Claims, 4 Drawing Sheets

MOWER GRASS COLLECTING AND DISTRIBUTING

BACKGROUND OF THE INVENTION

The present invention relates to a mower having a collecting box.

A conventional mower has a collecting box that has periodically to be emptied. Not only is this an additional chore, but the disposal of mounds of grass cuttings can cause problems. For example in a golf course, the greens have to be mown frequently, leading to large volumes of cuttings. It can be beneficial to distribute such cuttings thinly over the rougher grass areas, but such distribution is not easy to achieve.

SUMMARY OF THE INVENTION

Thus in a first aspect the present invention is broadly concerned to provide a mower having a collecting box for collecting grass cuttings, there being means for distributing the contents of the box on the ground while the mower is in motion. This can be used to dispose of grass cuttings or distribute other materials such as fertilisers. The collecting box may be detachable.

The invention is applicable to all variants of grass mowing equipment for commercial or domestic use. The collector may be either mounted in front or behind the machine and may use various methods for gathering the cuttings. The mower will generally have one or more cutting unit(s) which may be floating or non-floating. If they float, the collecting box may float with them or be fixed.

The automatic collection and distribution of material allows the operators of grass mowing equipment to empty cuttings in a fine covering where cuttings are of no particular problem without stopping the vehicle to dismount and manually empty. This may be particularly useful in the commercial greenskeeping field. When cutting golf putting greens the cuttings are collected and then can be spread evenly either on the fairway or in the rough when travelling between greens so that they may serve as a natural fertiliser. Further uses include laying seeds, pesticides, herbicides, top dressing materials and coloured dyes as part of the greenskeeper's normal cutting regime or specialist regimes.

In a second aspect the invention provides a method of grass maintenance comprising mowing grass using a mower according to the first aspect, and subsequently distributing material contained in the collecting box over a ground surface by traversing the mower over the ground surface while the contents of the box are ejected.

The collecting box may have one or more closable outlet openings. It may be arranged so that gravity tends to feed material through the opening(s), and/or there may be one or more mechanisms for urging the passage of material. For example there may be one or more exit openings controlled by one or more cylindrical brushes or paddles. They may be helical or straight in form and positioned anywhere along the base, front or rear of the catcher box. Means are provided to contra-rotate them about the longitudinal axis at such a rate that uneven spread may be eliminated or reduced. Other possibilities include a panel or panels flapping to and fro about a horizontal axis or reciprocating like a piston, a fan or fans, one or more fanned discs with vertical axes, or rake panels. Alternatively or additionally material may be fed towards an opening by gravity, belted conveyor, walking floor, shuffle floor, or one or more fans inclined at any angle. The conveying surface of a belt may be smooth or provided with ridges, flights or other features recognised in belt design for assisting with the conveying of material by the belt. Gravity or any of the other methods can be assisted by vibrating the catcher box with a reciprocating cam internal or external acting on the box or by the vibrating motion of the grass mowing machine as it travels.

Use may also be made of a splitting container which hinges open at a set rate such that, when activated, uneven spread may be eliminated or reduced.

The arrangement may be such that material is passed out of the container so that it falls onto the cutting means of the mower (e.g. one or more cutting cylinders) whose normal motion acts to distribute the material.

All of the above methods may be controlled in such a way that the rate of expulsion from the container may be varied by the grass mowing machine operator.

The methods of material delivery such as belted conveyor walking floor, shuffle floor or fan may be reversed in direction of motion so that when the mowing machine is cutting grass the grass is moved by one of the above methods further into the container. When emptying, the above methods reverse direction so that the material may be expelled from any where along the base of the container.

Some embodiments of the invention will now be described in more detail with reference to the accompanying drawings:

DESCRIPTION OF THE PREFERRED EMBODIMENTS

A typical mower has a framework or chassis with ground-engaging wheels, carrying a cutter unit and a collecting box. The mower may be self-supporting and self-propelled or may, for example, be adapted to be towed (and possibly wholly or partly supported by) a tractor.

Figure 21:
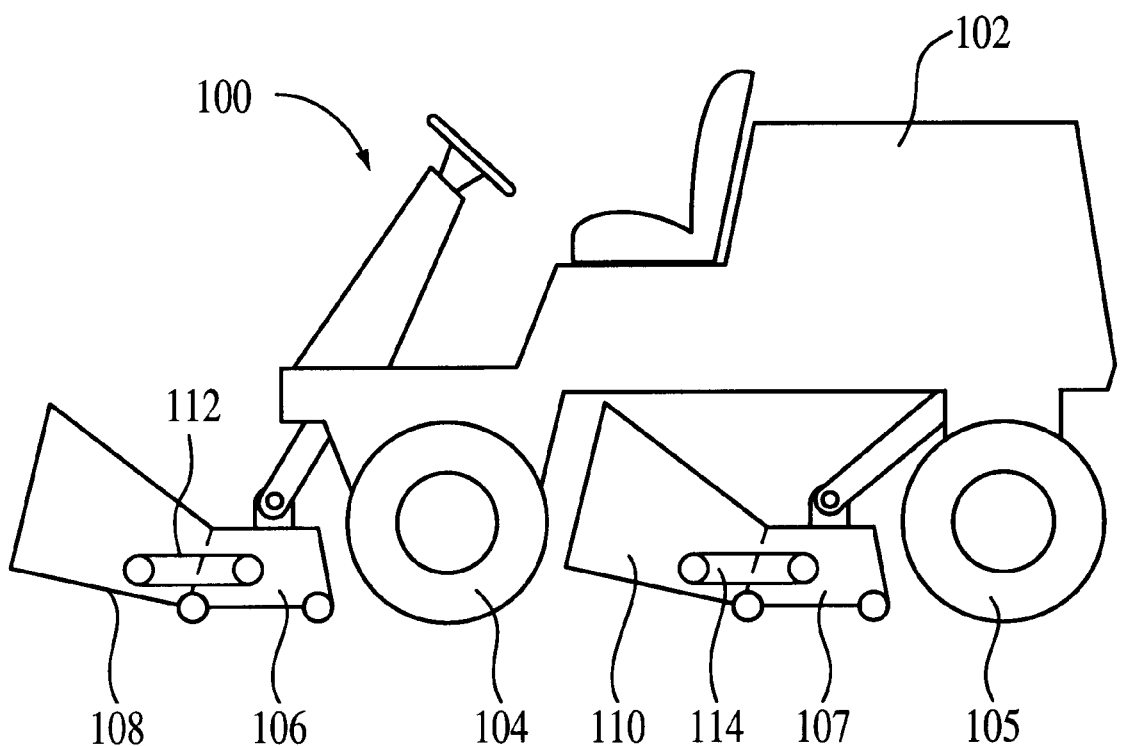
FIG. 21 is a schematic view of a mower embodying the invention.

FIG. 21 shows schematically a self-propelled mower 100 having a chassis 102 bearing front and rear sets of ground-engaging wheels 104,105. Front and rear grass cutting units 106,107 are mounted to the chassis in front of respective sets of wheels 104,105. Each cutting unit has an associated grass collecting box 108,110 (to be described later). The collecting boxes 108,110 shown in FIG. 21 are of a type requiring power and this is supplied by means of respective power take-offs 112,114 coupled to the cutting units.

Several examples of collecting boxes suitable for use in the present invention will now be described.

Figure 1:
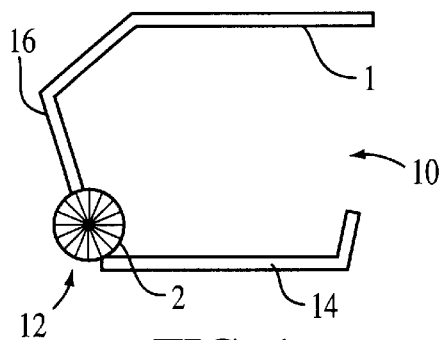
FIGS. 1–16 are schematic views of collector/distributor boxes usable in embodiments of the invention.
Figure 2:
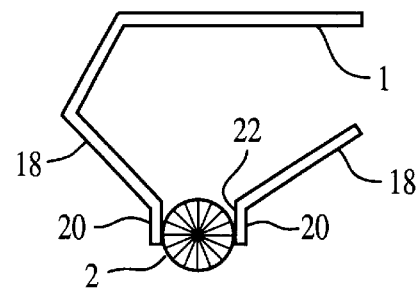
Figure 3:
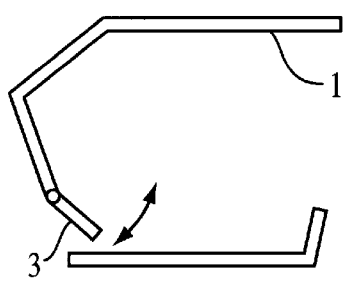
Figure 4:
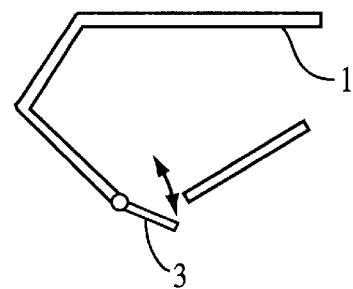
Figure 5:
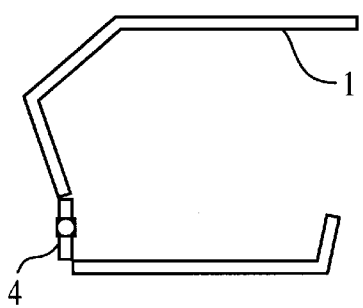
Figure 6:
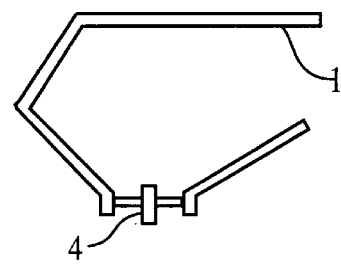
Figure 7:
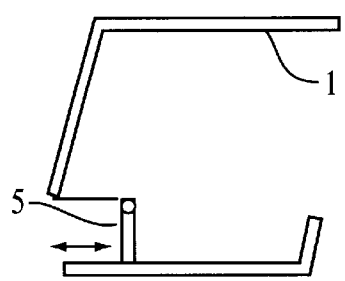
Figure 9:
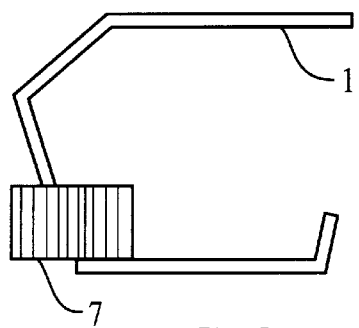
Figure 10:
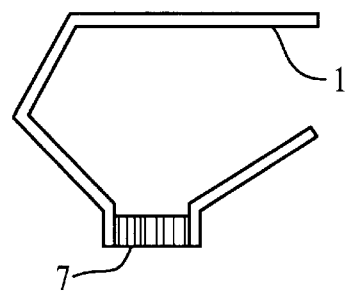
Figure 11:
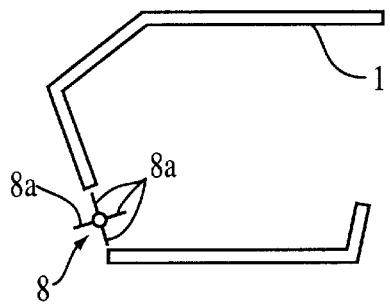
Figure 12:
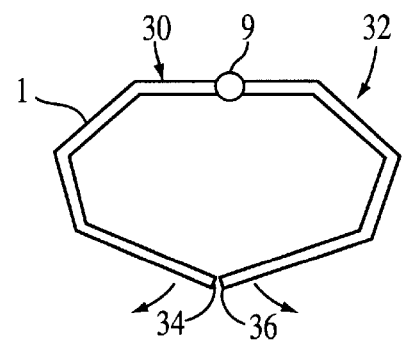

FIG. 1 shows a collecting box 1 having an inlet opening 10 for receiving grass cuttings from the cutter unit, in a generally conventional way. In a lower region it has an exit slot 12 with means for controlling the passage of material. In the embodiment of FIG. 1 the slot 12 is defined between a horizontal bottom wall and a side wall 16 which stops short of the bottom wall. FIG. 2 shows a variant in which the bottom part of the container is formed as a hopper, with a pair of base walls 18 sloping down to a spaced pair of flanges 20 defining the exit slot 22. In both FIGS. 1 and 2 there is a cylindrical brush 2 mounted in the exit slot so that, when stationary, it prevents the passage of the contents of the container whereas, when rotated, it feeds the contents out in a controlled fashion. FIGS. 3 and 4 show collecting boxes which are generally similar to those of FIGS. 1 and 2 respectively, but use oscillating hinged flaps 3 instead of cylindrical brushes 2. FIG. 7 shows a box similar to those of FIGS. 1 and 3 but with a flap 5 which is reciprocated like a piston between a position at which it closes the outlet slot and a position at which it is spaced from the outlet slot. FIGS. 5 and 6 show boxes with fans 4 located in the outlet slots. FIGS. 9 and 10 show analogous boxes using rotatable fanned discs 7. FIG. 11 shows a box like that of FIG. 1 but with the outlet slot controlled by a rotating rake 8. This is similar to the brush used in FIGS. 1 and 2 but with tines 8a instead of bristles. FIG. 12 shows a box having two portions 30,32 connected via an upper hinge 9 so that their lower edges 34,36 can be together as shown, or progressively spaced apart to provide a suitable exit slot.

Figure 8:
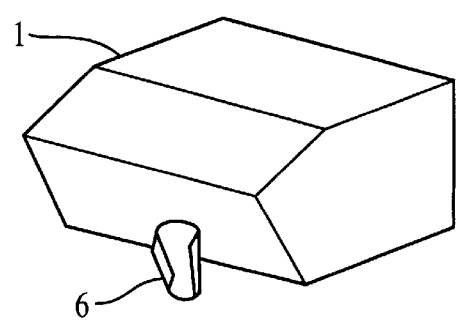

In some embodiments the exit opening may not be a wide slot. For example, fans and piston-type flaps as in FIGS. 5 and 7 may be used to expel material through one or more relatively small outlet openings. As shown in FIG. 8, the material may thus be fed to one or more spouts 6, which may be swivelled automatically to distribute the material.

Figure 13:
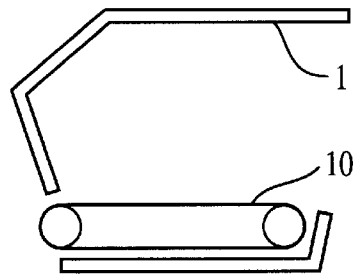
Figure 14:
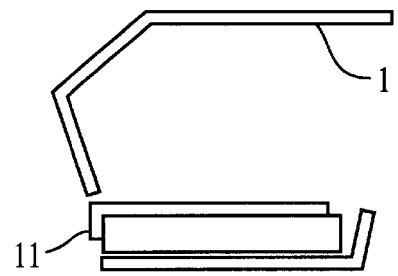
Figure 19A:
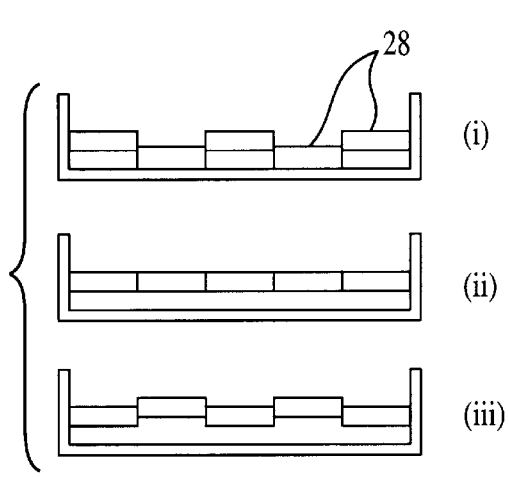
FIGS. 19A (*i*)–(*iii*) and B (*i*)–(*iii*) are end and plan views of a walking floor of a collector/distributor box.
Figure 19B:
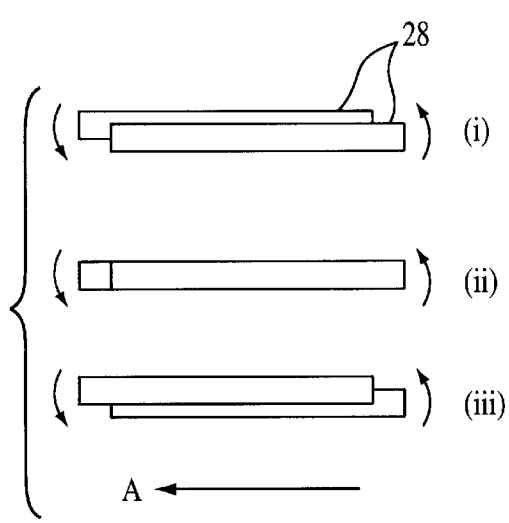

Within a box, the feeding of material to the exit outlet(s) may depend on gravity and/or be mechanically assisted. FIG. 13 shows a box generally as in FIG. 1 with a horizontally extending conveyor 10. FIG. 14 shows a walking floor 11. As shown in FIG. 19, this may be made up of a number of flat panels 28 along the base of the container which move in a reciprocating motion provided by a powered cam shaft. The walking motion may be generated by each panel being delayed by 180 degrees on the cam set up from the panels on either side. Arrow A of FIG. 19 indicates the direction of material movement.

Figure 15:
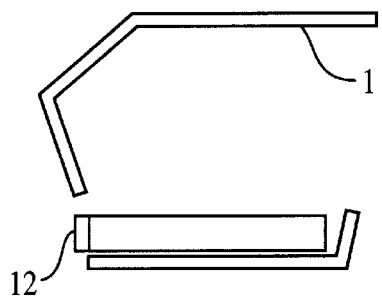
Figure 20:
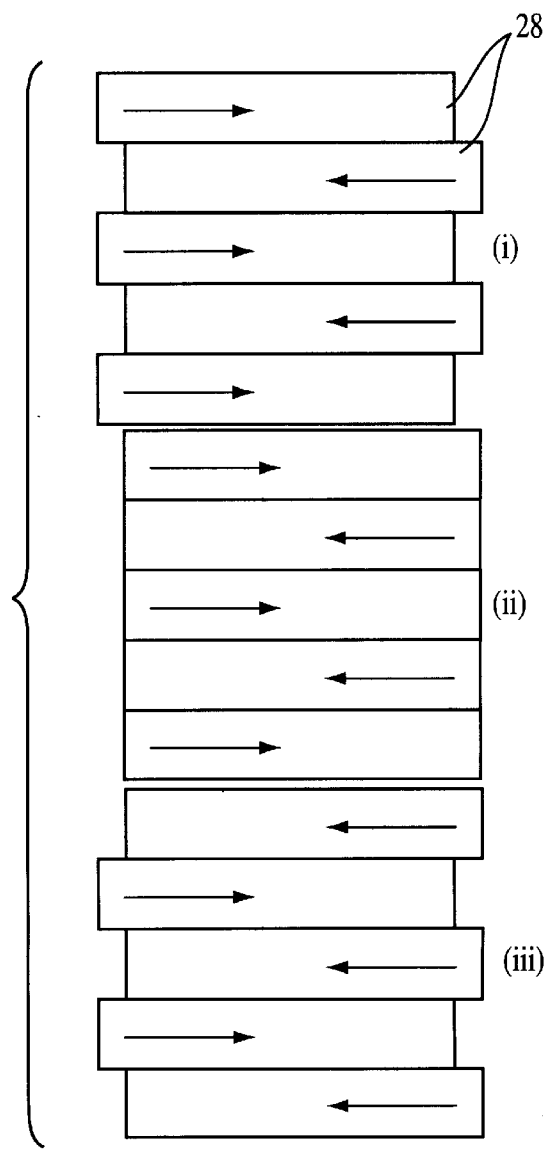
FIGS. 20(*i*)–(*iii*) are plan views of a shuffle floor of a collector/distributor box.

FIG. 15 shows a container with a shuffle floor 12. As shown in FIG. 20 this may be made up of one or a number of panels 28 along the base of the container which move in a linear fashion back and forth allowing the material to move to the exit point. When a number of panels are used the direction of motion of one panel to the next may be opposite.

Figure 16:
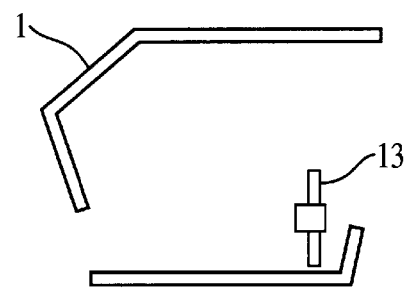

FIG. 16 shows a box with an internal fan 13 on the opposite side of the box from the exit opening, for blowing material towards and through the opening.

Figure 17:
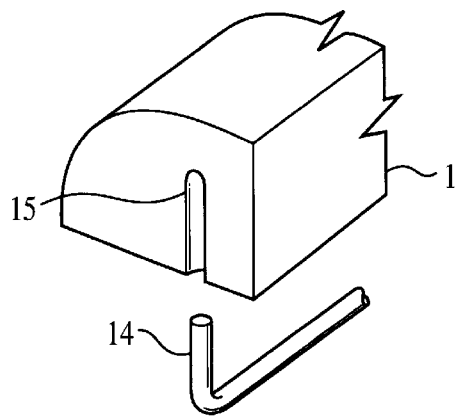
FIG. 17 is a sketch illustrating the connection of a collector/distributor box to the rest of a mower.
Figure 18:
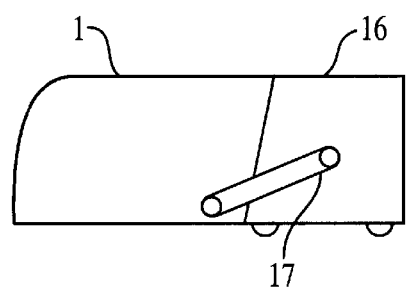
FIG. 18 is a schematic view of an assembly of a cutting unit and a collector/distributor box.

Most of the boxes described include one or more mechanisms that require to be driven. They will generally be powered by their own source (motor, internal or external to the catcher unit) via connections to a supporting structure 14 on the grass mowing machine for the catcher box 1 (see FIG. 17). For an electric motor, a low voltage electrical supply may be provided to metal location supporting structure struts 14 on the grass mowing machine permanently. The catcher box locates on the struts 14 and connection points 15 located in the catcher box location channels pull power from the struts 14 and route it to the motors. For other types of motor the power (air or other fluid) may be routed to the supporting structure struts 14 on the grass mowing machine and the connection may be made with the use of quick release unions 15 on the catcher box so that when the box 1 is placed on the machine, power may be automatically provided. Alternatively the power for the mechanisms may be provided via a take off 17 from the cutting unit 16 of the grass mowing machine (see FIG. 18) or from the vehicle's/cutting unit's wheels or via a roller on the container. Components may be powered by a belt driven from a spinning cutting reel or rollers on the cutting unit(s). There may be a driven roller on the container, whence a belt takes power to a component.

Whereas the invention has been described with reference to preferred embodiments, it will be appreciated by the person skilled in the art that various changes and modifications can be made without departing from the spirit and scope of the invention. It is intended to cover all such changes and modifications by the appended claims.

We claim:

1. A mower comprising a cutting unit and a collecting box for receiving and storing material cut by the cutting unit; wherein said collecting box has an outlet opening, discharge means selectively operable to discharge material from the box through said outlet opening and distribute it uniformly over the ground, and conveying means within said collecting box selectively operable to feed the received material towards said outlet opening.

2. A mower according to claim 1 wherein said collecting box is constructed and arranged so that gravity tends to feed material in said box through said outlet opening; and wherein said discharge means comprises a closure displaceable so as to prevent or permit the feeding of said material through said outlet opening.

3. A mower according to claim 1 wherein said outlet opening is elongate and said discharge means comprises one or more rotatable elongate brush or paddle members located at the opening so that rotation of said one or more members causes said discharge of material.

4. A mower according to claim 1 further including a swivellable spout coupled to said outlet opening to receive material to be discharged; said spout being swivellable to distribute said material.

5. A mower according to claim 1 wherein said conveying means is also operable in reverse to feed material away from said outlet opening.

6. A mower according to claim 1 wherein said collecting box is mounted so that material discharged through said outlet opening falls onto said cutting unit so that operation of the cutting unit effects distribution of the material.

7. A mower according to claim 1 further including vibration means for effecting vibration of the collecting box.

8. A method of grass maintenance employing a mower comprising a cutting unit and a collecting box for receiving and storing material cut by the cutting unit; wherein said collecting box has an outlet opening and discharge means selectively operable to discharge material uniformly from the box through said outlet opening; said method comprising a first step of passing said mower over a first area of grass while operating said cutting unit so that said grass is mown and grass cuttings are received and stored in said collecting box; and a second step of passing said mower over a second area of grass, which is different from said first area, while operating said discharge means so that material cut from the first area and stored in said collecting box is discharged through said outlet opening and distributed uniformly over said second area of grass, said discharge means including conveying means within said collecting box operable to feed the received material toward the outlet opening, and said second step includes operating said conveying means to feed said material towards said outlet opening.

9. A method according to claim 8 wherein said material which is discharged in said second step comprises said grass cuttings received in said collecting box in said first step.

10. A method according to claim 8 including a step of filling a treatment agent selected from seeds, pesticides, herbicides, top dressing materials and dyes into said collecting box and passing said mower over said first area of grass while operating said discharge means so that said treatment agent is discharged through said outlet opening and distributed over said first area of grass.

* * * * *